United States Patent [19]

Hasegawa et al.

[11] Patent Number: 4,733,581
[45] Date of Patent: Mar. 29, 1988

[54] AUTOMATIC TRANSMISSION PROVIDED WITH MODE PREVENTING INCREASE IN OIL TEMPERATURE

[75] Inventors: Hiromi Hasegawa, Obu; Toshiaki Ishiguro, Nagoya, both of Japan

[73] Assignee: Aisin Seiki Kabushiki Kaisha, Kariya, Japan

[21] Appl. No.: 912,372

[22] Filed: Sep. 29, 1986

[30] Foreign Application Priority Data

Sep. 30, 1985 [JP] Japan .............................. 60-216398

[51] Int. Cl.⁴ .............................................. B60K 41/04
[52] U.S. Cl. ........................................ 74/864; 74/866
[58] Field of Search ................ 74/866, 864, 861, 865, 74/867, 844; 364/424.1

[56] References Cited

U.S. PATENT DOCUMENTS

| | | | |
|---|---|---|---|
| 3,640,156 | 2/1972 | Mori et al. | 74/844 X |
| 3,724,294 | 4/1973 | Gaus | 74/844 X |
| 4,509,124 | 4/1985 | Suzuki et al. | 74/866 X |
| 4,524,645 | 6/1985 | Tatsumi | 74/861 X |
| 4,572,029 | 2/1986 | Kinugasa et al. | 74/866 |
| 4,590,561 | 5/1986 | Abo et al. | 74/866 X |

FOREIGN PATENT DOCUMENTS

| | | | |
|---|---|---|---|
| 2336772 | 1/1974 | Fed. Rep. of Germany | 74/866 |
| 3138584 | 4/1983 | Fed. Rep. of Germany | 74/866 |
| 0088250 | 5/1983 | Japan | 74/844 |
| 187640 | 11/1983 | Japan | |

Primary Examiner—Lawrence J. Staab
Assistant Examiner—David Novais
Attorney, Agent, or Firm—Burns, Doane, Swecker & Mathis

[57] ABSTRACT

The present invention provides an automatic transmission provided with an oil temperature increase prevention mode which automatically shifts gears on the basis of a gear-change pattern of that mode, and which is one of a plurality of gear-change patterns, in which downshift points are shifted toward the high-speed side from a standard gear-change pattern when the oil temperature signal rises above the level of a signal corresponding to a given temperature; and a control system for judging that oil temperature has increased to a given temperature on the basis of the oil temperature signal, and generating control signal so as to change the mode to the oil temperature increase prevention mode.

5 Claims, 7 Drawing Figures $e = \dfrac{N_T}{N_E}$

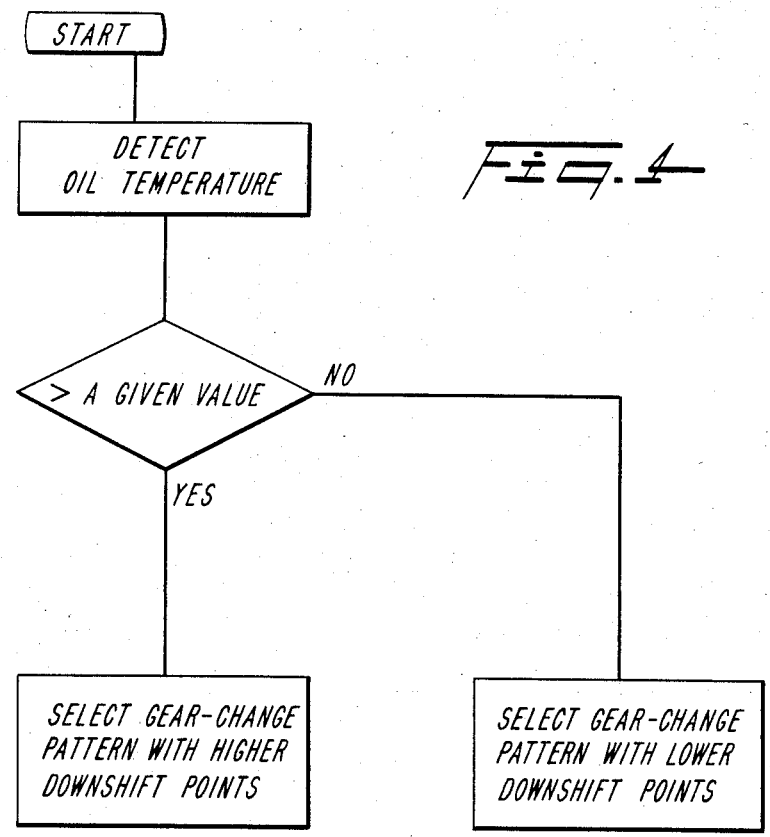
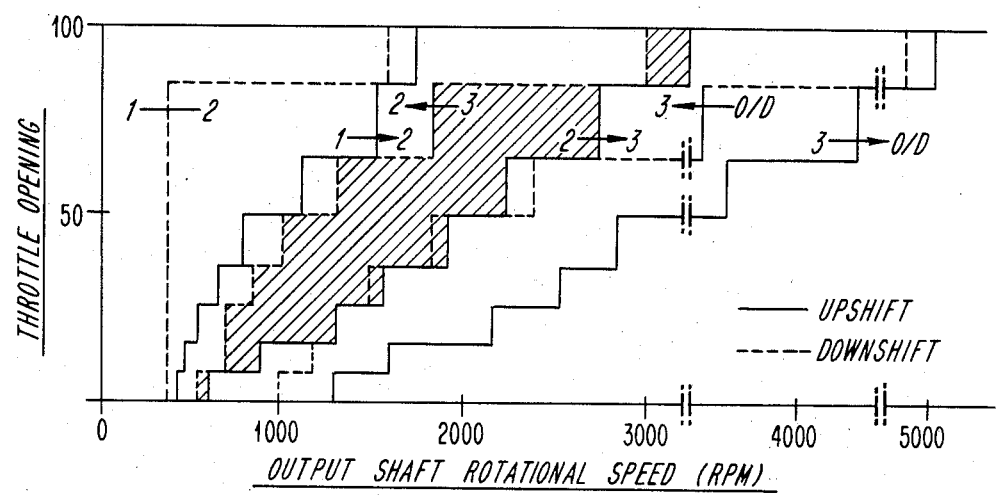

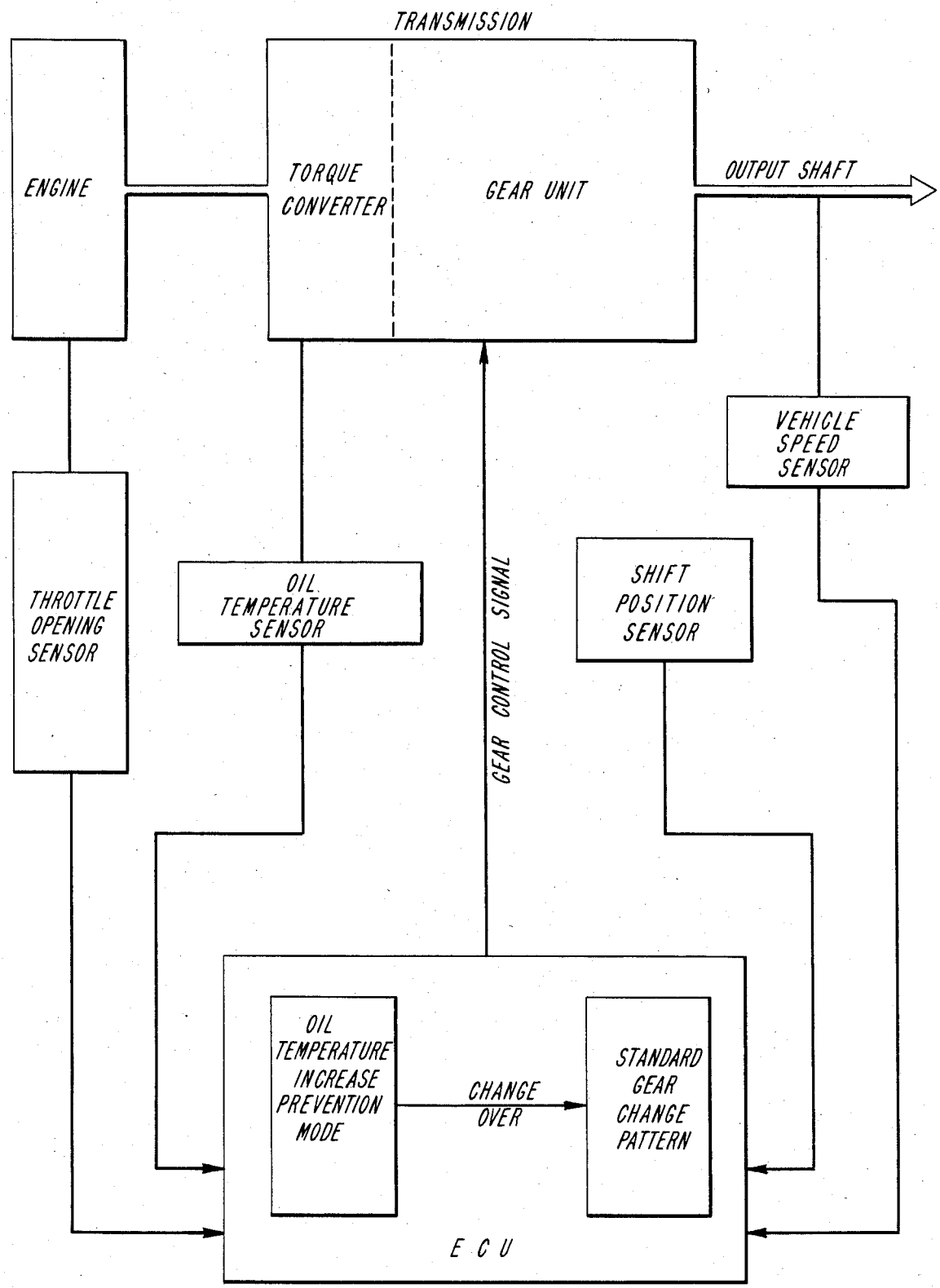

AUTOMATIC TRANSMISSION PROVIDED WITH MODE PREVENTING INCREASE IN OIL TEMPERATURE

BACKGROUND OF THE INVENTION

1. Field of the Invention

The present invention relates to a transmission control means in an automatic transmission which has a plurality of gear change steps and which is provided with an oil temperature increase prevention mode which automatically shifts gears on the basis of a gear shift pattern of that mode, when the oil temperature of the automatic transmission rises.

2. Description of Prior Art

In an automatic transmission provided with a torque converter, the oil temperature is increased by heat generated by slip losses of the torque converter, and this high-temperature oil adversely affects the durability (frictional engaging members, etc.) and sealing properties of the transmission. For example, when a vehicle is heavily loaded (when climbing a hill, etc.), the temperature of its transmission increases, and can even reach such a high temperature that it adversely affects the transmission, as described hereinafter. In this case, a downshift increases the speed ratio $e = (N_T/N_E)$ of the torque converter, as well as its efficiency, as shown in FIG. 2, and thus reduces the slip losses of the torque convertor, resulting in a prevention of the increase in oil temperature. However, the automatic transmission is provided with a certain amount of hysteresis, as shown in FIG. 6 (the hatched portion), to prevent frequent and alternate generations of upshifts and downshifts (hunting). Therefore, the downshift points are set at lower speeds than upshift points, at sufficient spacing, so that it is difficult to immediately shift gear downwardly. Therefore, when a vehicle is loaded, it is a fact that, in general, the oil temperature is likely to increase. This phenomenon cannot be removed from the conventional design concept that the automatic gear-change control of a transmission is provided with hysteresis. This problem occurs with large vehicles with which are often heavily loaded, freight vehicles, and vans, or when going up hills, regardless of the type of vehicle.

An object of the present invention is to solve this problem of the prior art. Namely, it is an object of the present invention to improve the automatic transmission so as to enable the maintenance of easy operating ability and controllability during driving, while preventing any excess increase in oil temperature.

DETAILED DESCRIPTION OF THE INVENTION

In an automatic transmission provided with a torque converter, a plurality of gear-change steps, a plurality of gear-change patterns which select the change gear-change steps which are determined by the rotational speed of the output shaft and the throttle opening, an automatic gear means for automatically changing the gear-change steps on the basis of the gear-change patterns, and an oil temperature sensor which generates an oil temperature signal is provided. The improvement which is the object of the invention is achieved as described below.

The present invention provides an automatic transmission characterized by being provided with an oil temperature increase prevention mode which automatically shifts gears on the basis of a gear-change pattern of that mode, and which is one of a plurality of gear-change patterns, in which downshift points are shifted toward the high-speed side from a standard gear-change pattern when the oil temperature signal rises above the level of a signal corresponding to a given temperature; and a control means for judging that oil temperature has increased to a given temperature on the basis of the oil temperature signal, and generating a control signal so as to change the mode to the oil temperature increase prevention mode.

In this case, preferred gear-change patterns which are used as the model for preventing any increase in oil temperature are as follows:

(i) A gear-change pattern in which the downshift points of all the gear-change steps are shifted toward the high- speed side (batch modification mode).

(ii) A gear-change pattern in which the downshift points of only some of the gear-change steps are shifted toward the high-speed side (partial modification mode).

(iii) A modified mode in which, when an increase in oil temperature is detected, a forced downshift is immediately carried out, following a standard pattern, and in which, if the oil temperature does not drop, the gear-change pattern is changed to a pattern (oil temperature increase prevention mode) which is either mode of (i) or (ii) (forced downshift mode).

The principal configuration of the automatic transmission provided with a mode for preventing an increase in oil temperature of the present invention is shown in FIG. 7. In a power driving system, an engine, a transmission provided with a torque converter, and an output shaft are provided with a throttle opening sensor, an oil temperature sensor, shift position sensor, and a speed sensor, respectively. Each of these sensors sends output signals to a control computer (ECU) and the ECU generates gear control signals on the basis of change-over signals between a standard gear-change pattern and the oil temperature increase prevention mode, so as to shift the gears of the transmission.

The relationship between the gear ratio e and torque converter efficiency $\eta$ (efficiency of the output of the torque converter's turbine relative to the output of the engine) is described below and is shown in FIG. 2.

The heat generated by slip losses of the torque converter can be converted into a value of loss horsepower of the torque converter, as follows:

$$\text{Loss horsepower (HP)} = \frac{T_E N_E}{716} \times (1 - \eta) \quad (1)$$

$$\text{where } \eta = \frac{N_T T_T}{N_E T_E}$$

wherein $N_T$ and $T_T$ respectively denote the rotational speed and the output torque of the torque converter, $N_E$ and $T_E$ respectively denote the rotational speed and the output torque of the engine, and $\eta$ denotes the efficiency of the torque converter.

If the oil temperature becomes extremely high while a heavily-loaded vehicle is running at a constant speed, a downshift increases the rotational speed of the turbine by the change in gear ratio ($N_{T1} - N_{T2}$ in FIG. 3) and increases the speed ratio e. Therefore, the efficiency also increases as shown in FIG. 2. When the vehicle is running at constant speed, since the output energy of the automatic transmission does not change, the output energy of the engine ($T_E \times N_E$ of Formula (1)), after the gear change may become smaller but not larger than that before the gear change if there are almost no energy losses within the transmission (because $N_E$ is reduced in order to prevent acceleration during constant-speed running). Therefore, the loss horse power is reduced in accordance with Formula (1), resulting in the prevention of any increase in oil temperature.

In the above downshift control method, an oil temperature sensor is provided in the automatic transmission. As this oil temperature sensor, a general-purpose temperature sensor or, preferably, an oil temperature sensor which generates a signal when the oil temperature rises above a predetermined temperature, is used. In the former case, an increase in oil temperature to a high temperature region is directly judged by a computer from a digitized signal, or its output as an HL signal relative to a given temperature from a differential amplifier. In the latter case, the high-temperature signal from the oil temperature sensor can be directly used for control. On the basis of a signal obtained in such a manner, the downshift points are shifted toward the high-speed side (so that the rotational speed of the output shaft is increased), so as to facilitate a downshift.

BRIEF DESCRIPTION OF DRAWINGS

FIGS. 4 and 5 are flow charts of embodiments of control methods;

FIG. 6 shows an example of a standard gear-change pattern; and

FIG. 7 shows a basic block diagram of the apparatus of the present invention.

DETAILED DESCRIPTION OF AN EMBODIMENT OF THE INVENTION

The present invention is described in detail below with reference to an embodiment thereof.

As an embodiment of the present invention, the D range shift pattern, as shown in FIG. 6 where the throttle opening $\eta$ (ordinate) and the output shaft rotational speed (rpm) which is related to the vehicle speed (abscissa) are set as coordinates, is stored in a micro-computer (ECU) as a standard gear-change pattern. This shift pattern is an example of an economy pattern in which fuel savings are emphasized. In general, the signals from a temperature sensor for engine-cooling water, a brake sensor, and a knock sensor are input to the ECU as auxiliary data, but these are not shown in the figure.

In FIG. 6, the gear-change pattern of each of the upshift and downshift steps are shown by solid lines and broken lines, respectively. As shown in the figure, a large hysteresis region, shown hatched, is provided between the 2→3 upshift gear-change line and the 3→2 downshift gear-change line, in order to prevent hunting. This is a characteristic of the economy pattern in which fuel savings are emphasized because, once a certain speed is attained by acceleration, constant-speed running at as high a speed side as possible enables the engine's rotational speed to be maintained at a suitable low level and fuel to be saved.

Figure 1:
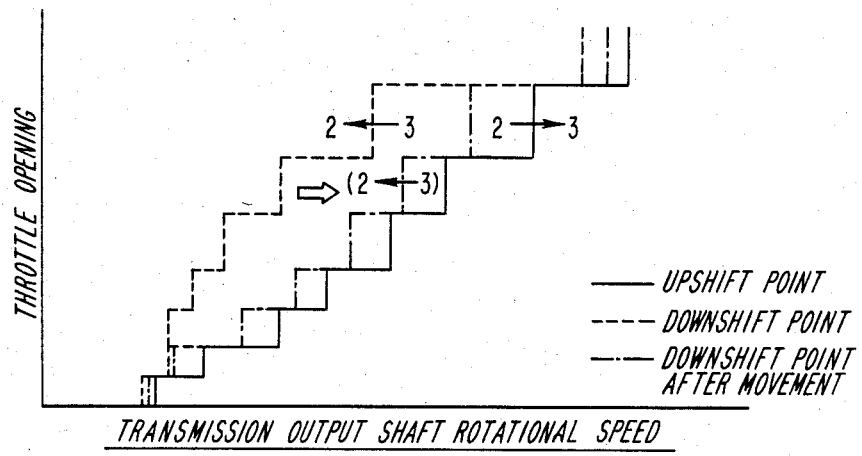
FIG. 1 shows an example of the gear-change pattern provided between second and third gears by an embodiment of the present invention.
Figure 2:
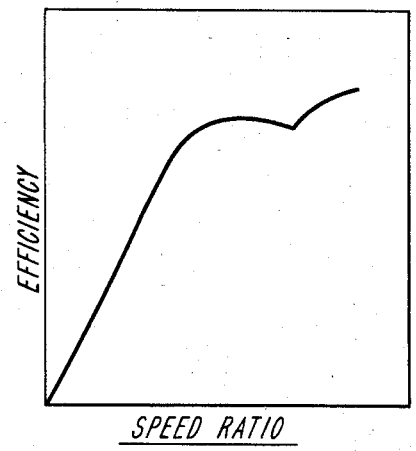
FIG. 2 is a graph of the relationship between speed ratio e and efficiency.
Figure 3:
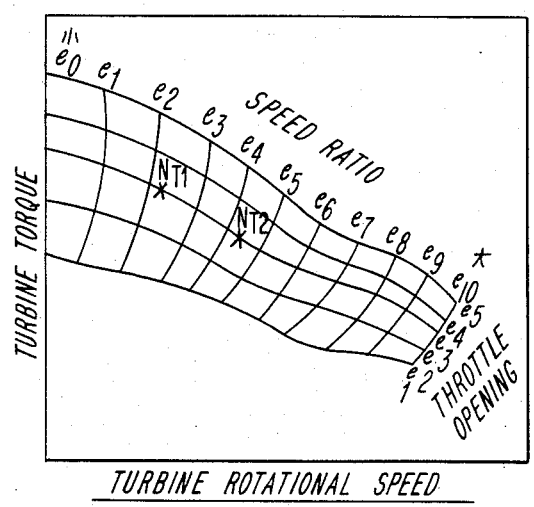
FIG. 3 is a graph of the relationships between turbine rotational speed $N_T$ and turbine torque $T_T$ and speed ratio e and throttle opening $\eta$.

The 2→3 gear-change pattern of FIG. 6 is shown in FIG. 1. In this case, if the oil temperature is lower than a standard state (below a given value), the standard pattern is maintained. When an oil temperature above a given value is detected or determined, the 3→2 shift line is moved to the dashed line (3→2) line, that is, toward the higher-speed side, so as to form the gear-change pattern of the oil temperature increase prevention mode. The pattern of the oil temperature increase prevention mode is set and stored in a separate EPU and is read out in response to a change-over signal each time the oil temperature rises above the give value.

In this case, the oil temperature increase prevention mode consists of various modes such as (i) the batch modification mode, (ii) the partial modification mode, and (iii) the forced downshift mode (as well as combinations of (iii) and (i), and (iii) and (ii)), as described before. Gear-change patterns which are shifted to the high-speed sides are set for the other gear-change patterns 2→1 and O/D→3, respectively, in a similar manner to FIG. 1. Of these modes, in mode (i), all the gear-change steps are modified into the those of the oil temperature increase prevention mode, while in mode (ii), an oil temperature increase prevention mode in which only the downshift lines of some of the steps are shifted toward the high-speed sides (so that the other steps remain at the standard pattern), is used.

Furthermore, in mode (iii), the forced downshift mode, when the oil temperature rise above a given value, the standard downshift signals are cancelled so as to carry out a forced downshift from the step at which the vehicle is currently running to the immediately-lower step (for example, in FIG. 1, when running in third gear, to second gear), while maintaining the standard gear-change pattern. When the oil temperature later drops, the original standard gear-change pattern is recovered.

If the oil temperature does not drop, a gear-change pattern having higher downshift points is selected so that the gear changes are controlled by this pattern until the oil temperature drops. The oil temperature is temporarily lowered by the forced shiftdown for a given period of time.

Batch modification mode (i) is operated by the flow chart shown in FIG. 4. The oil temperature is detected, the oil temperature signal is input to the EPU, a decision is made as to whether the corresponding oil temperature is higher than a given temperature, and, if the answer is NO, the standard gear-change pattern is selected, or if the answer is YES, the gear-change pattern having higher downshift points (the oil temperature increase prevention mode) is selected. This routine is repeated within the EPU so that the standard gear-change pattern or the oil temperature increase prevention mode is automatically selected at all times on the basis of the detection of and determination of an oil temperature.

Figure 5:
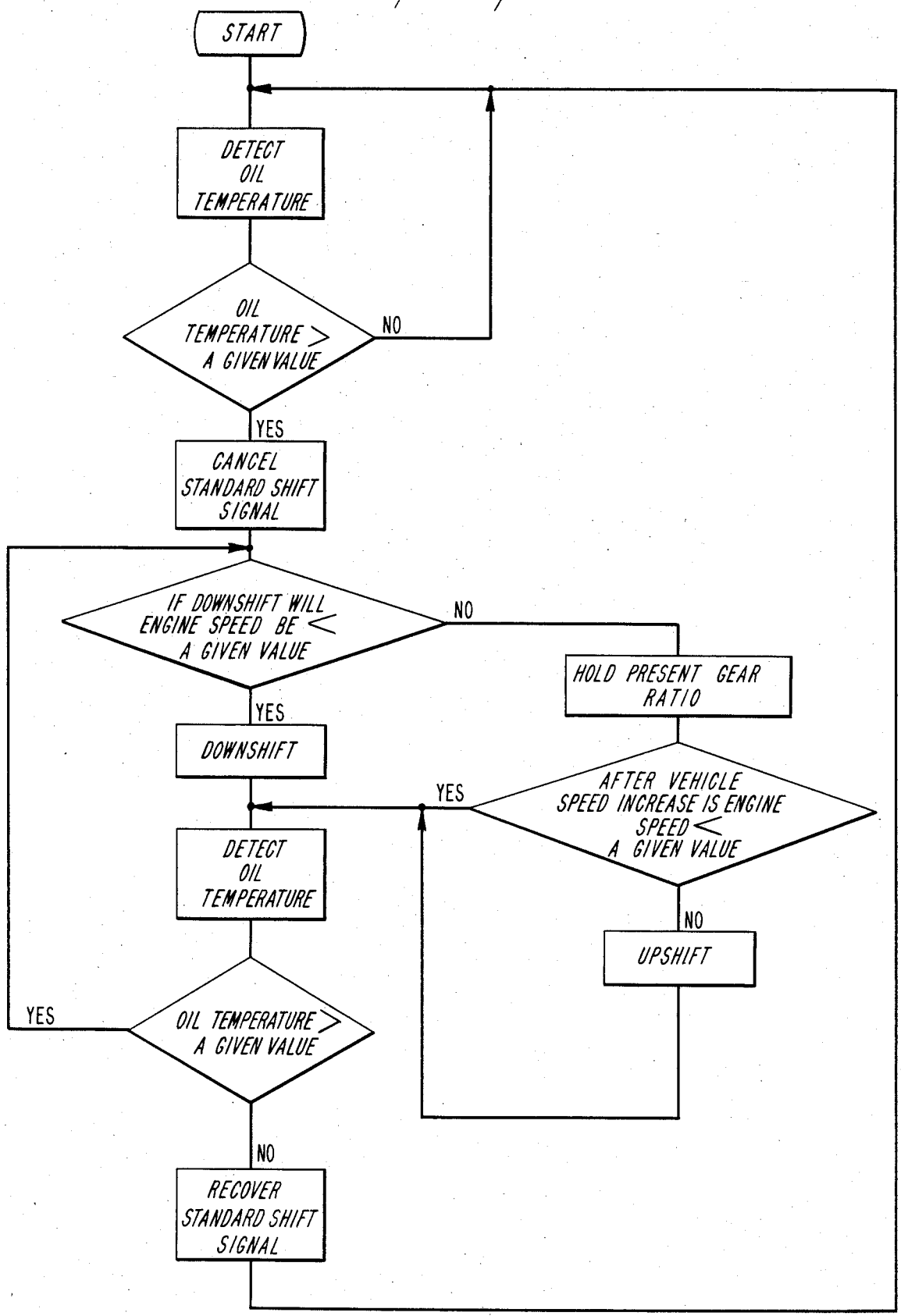

The forced downshift mode (iii) controls as described below in accordance with the flow chart shown as an example in FIG. 5.

After starting the vehicle, the oil temperature is detected by an oil temperature sensor and compared with a given or predetermined value of oil temperature. If the temperature is less than the given value, the standard shift signal is used and the oil temperature is continuously monitored. If the oil temperature is greater than the given value, the standard shift signal is cancelled only when the engine speed will be less than a given or predetermined value. If the engine speed will be less than this value, a downshift is then initiated. The oil temperature is again detected by an oil temperature sensor and compared with a given or predetermined value of oil temperature. If the oil temperature is less than the given or predetermined value, the standard shift signal is recovered and the standard shift pattern is reinstated. After the standard shift signal is reinstated, the oil temperature is again continuously monitored.

The flow chart shows further comparisons which assist in controlling the forced downshift mode. For example, if the downshift will give an engine speed which is greater than a predetermined or given value, the downshift will not be permitted to occur and a signal will be initiated to hold the present gear ratio of the transmission. After the vehicle speed increases in the held gear ratio, the engine rotational speed is monitored and a determination is made whether or not it is less than a given or predetermined value. If the engine speed is not less than this given value, an upshift will occur in the automatic transmission and the oil temperature is again detected by an oil temperature sensor and compared with a given value. Additionally, the downshift which occurs after it is determined that an engine speed will be less than a given or predetermined value always initiates an oil temperature detection sequence so as to compare whether the oil temperature is greater than the predetermined or given value. If the temperature is found to be above this value, a signal is given to again monitor the determination of whether a downshift will permit the engine speed to be less than the given value. This operation puts the flow chart control function into a loop which wil continuously monitor engine speed with respect to a given value, continuously require downshifting and continuously detect oil temperature and compare it to a given value. The loop is broken when, as explained above, the program determines that the present gear ratio should be maintained or determines that the oil temperature is less than a given value so as to permit the standard shift signal to be recovered and to permit the vehicle to continue operations in the standard shift mode.

The time set by the timer is sufficient to effect a temporary decrease in the oil temperature and is set after it has been measured by the transmission. However, an excessively long period of time is avoided from consideration of the case in which the oil temperature still does not drop.

An oil temperature of 150° C. or more is generally considered to be dangerous, and even long-term running at 140° C. is not advisable. A temperature of 120° C. or less is generally the preferred condition. In addition, the present invention can be applied to all ranges in which downshift is possible, for example, the D range (three or more steps) and the so-called "2" range.

In order to prevent an increase in oil temperature, the following methods can be considered. Namely, it is known as prior art that various gear-change patterns (set by power performance and fuel-cost performance, etc) and a manual switch which can be used to freely change these gear-change patterns can be provided so that the driver can operate the manual switch according to preference to change the gear-change patterns (Japanese Patent Laid-Open No. 187640/1983). However, with such a manual change-over method, if a warning light is turned on by signals from an oil temperature sensor when the temperature rises, the driver must turn the manual switch ON or OFF each time, which is inconvenient. This method requires a manual change-over between at least two gear-change patterns, and if two more change-over operations relating to oil temperature are added, the driver could become confused in rapidly deciding which of the gear-change patterns should be selected. Therefore, the manual change-over method is not preferable from the viewpoint of the controllability by the driver.

In the other hand, the present invention has the effect that since the change to the oil temperature increase prevention mode is automatically carried out by the ECU at all times, the driver can keep his mind on driving without worrying about oil temperature, and it is possible to prevent any deterioration in the durability of the transmission due to an excessive increase in oil temperature, and thus improve the performance thereof.

We claim:

1. An automatic transmission driven by an output shaft of an engine and provided with a torque converter, a plurality of gear-change steps, a plurality of gear-change patterns which select said gear-change steps as are determined by the rotational speed of the output shaft and throttle opening of the engine, an automatic gear means for automatically changing said gear-change steps on the basis of said gear-change patterns, and a transmission oil temperature sensor which generates a transmission oil temperature signal comprising an oil temperature increase prevention mode which automatically shifts gears on the basis of a gear-change pattern of said mode, and which is one of a plurality of gear-change patterns, in which downshift points are shifted to a gear-change based on a speed higher than a standard gear-change pattern when said oil temperature signal is above a level of a signal corresponding to a given temperature; and a control means for determining when oil temperature has increased to a given temperature on the basis of said oil temperature signal, and generating a control signal so as to change said mode to said oil temperature increase preventive mode.

2. The automatic transmission of claim 1, wherein the oil temperature increase prevention mode detects the oil temperature and compares the detected temperature to a given value of temperature and retains the standard gear-change pattern if the detected temperature is less than the given value.

3. The automatic transmission of claim 2, wherein the gear-change pattern is shifted for less than all of the plurality of gear-change steps.

4. The automatic transmission of claim 1, wherein the detected oil temperature above the given value cancels the standard downshift signal so as to force a downshift from the gear-change step to a next lower gear step.

5. The automatic transmission of claim 4, wherein standard gear-change pattern is reinstated when the detected oil temperature is less than the given value.

* * * * *